United States Patent [19]

Himmel

[11] 4,124,797

[45] Nov. 7, 1978

[54] APPARATUS AND METHOD FOR READING RANDOMLY ORIENTED CHARACTERS

[75] Inventor: David P. Himmel, Dallas, Tex.

[73] Assignee: Recognition Equipment Incorporated, Dallas, Tex.

[21] Appl. No.: 847,348

[22] Filed: Oct. 31, 1977

[51] Int. Cl.² .................. G06K 7/10; G06K 9/00; G06K 7/14

[52] U.S. Cl. .................... 235/467; 250/567; 340/146.3 H

[58] Field of Search ............ 235/467, 454, 462, 470, 235/471; 340/146.3 H; 250/555, 566, 567, 568, 569

[56] References Cited

U.S. PATENT DOCUMENTS

| | | | |
|---|---|---|---|
| 3,246,126 | 4/1966 | Schlieben et al. | 340/146.3 H |
| 3,603,728 | 9/1971 | Arimura | 340/146.3 H |
| 3,684,867 | 8/1972 | Acker | 235/437 |
| 3,693,154 | 9/1972 | Kubo et al. | 340/146.3 H |
| 3,701,098 | 10/1972 | Acker | 340/146.3 H |
| 3,718,761 | 2/1973 | Myer | 235/467 |
| 3,774,014 | 11/1973 | Berler | 235/467 |
| 3,801,775 | 4/1974 | Acker | 340/146.3 H |
| 3,852,573 | 12/1974 | Dolch | 340/146.3 H |
| 3,885,229 | 5/1975 | Negita et al. | 340/146.3 H |

Primary Examiner—Daryl W. Cook

Attorney, Agent, or Firm—John E. Vandigriff; Thomas W. DeMond

[57] ABSTRACT

An apparatus and method for reading randomly oriented characters having a laser producing a narrow beam of coherent light which is focused by a telescope onto indicia located on a written medium. The focus beam of light is directed by a scanner located intermediate the telescope and the indicia. The scanner directs the beam of light across an area in a known sequence. The light reflected from the written medium having the indicia thereon is received by a photomultiplier detector. The processor which receives the output of the photomultiplier detector determines the observed orientation of the indicia, and the angle between the observed orientation of the indicia and a desired orientation of the indicia. The processor then generates a signal which causes a beam rotating means located between the scanner and the indicia to be rotated to a position so that the indicia are now scanned in the known sequence having the desired orientation with respect to indicia. Characters which are to be read are located adjacent to the indicia. It is desired to scan the characters with the laser beam at the orientation to which the beam rotating means was rotated. The photomultipler detector receives the reflected light from the characters and the written medium as the characters are scanned in the known sequence at the desired orientation.

16 Claims, 10 Drawing Figures

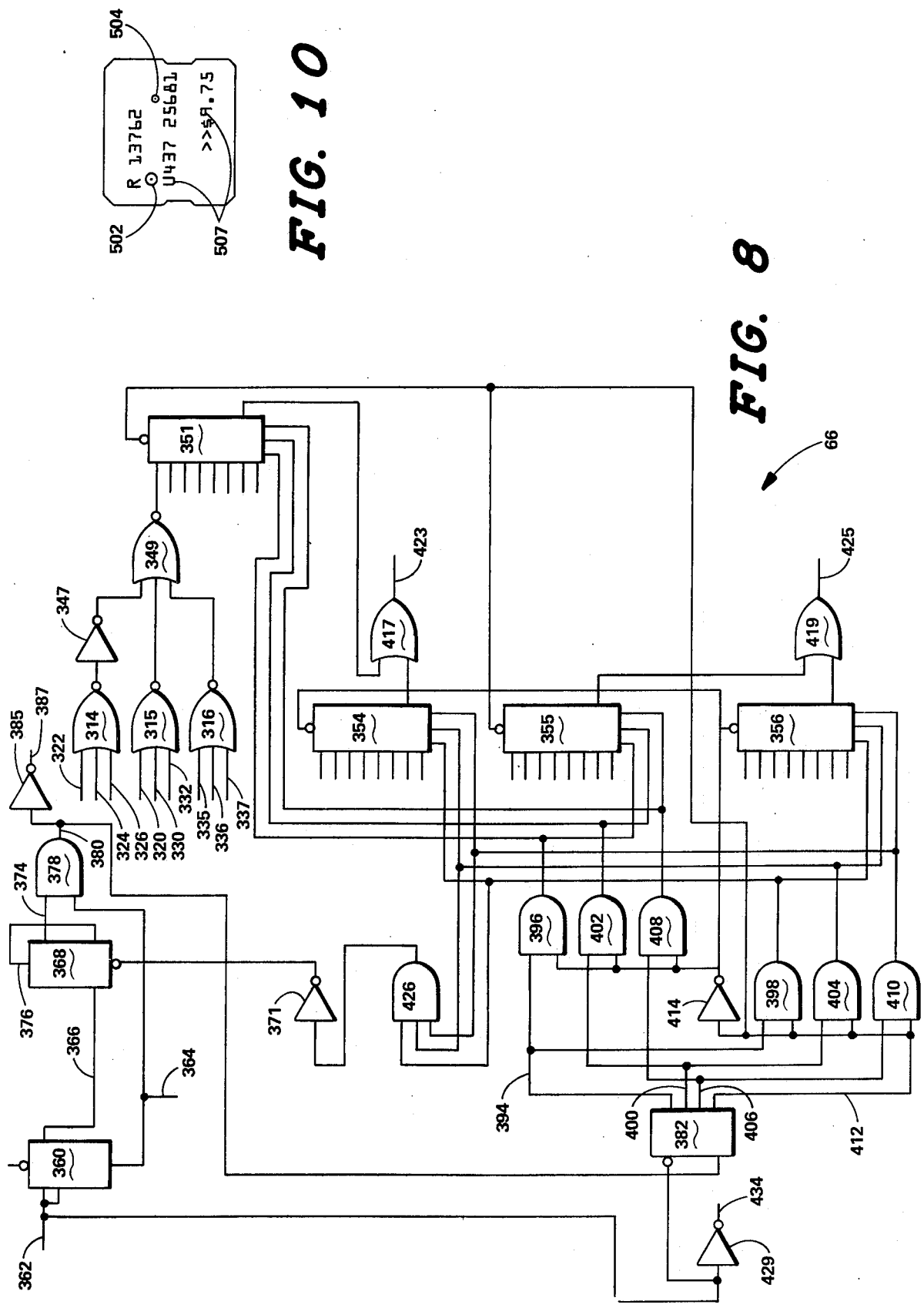

APPARATUS AND METHOD FOR READING RANDOMLY ORIENTED CHARACTERS

BACKGROUND OF THE INVENTION

1. Field of the Invention

The present invention relates to an apparatus and method for compensating for the random orientation of characters which are presented to be read and, more particularly, the invention relates to an apparatus and method for compensating for randomly oriented characters which utilizes a laser scanning beam, indicia having a fixed orientation with respect to said characters, and a beam rotating means intercepting the scanning beam which rotates the scanning beam to an orientation at which it is desired to scan the characters.

2. Brief Description of the Prior Art

Reference is made to the following U.S. Patents: U.S. Pat. Nos. 3,684,867 issued to Acker on Aug. 15, 1972 and entitled "Apparatus for Reading Randomly Positioned Data", and 3,718,761 issued to Myer on Feb. 27, 1973 and entitled "Omnidirectional Planar Optical Code Reader".

Acker shows and describes a bar code reader which is adapted to read randomly oriented data fields. Reflected light from the written medium is collected by a lens for focusing the beam to be scanned across an optical sensor. The collected beam of light prior to being redirected by the scanning system passes through a dove prism which is utilized to rotate the image. The prism has a continuous rotation until a certain condition based upon special markings is detected. The marking is a long straight line which has a contrasting edge extending perpendicular to the track along which it is desired to scan. When the condition is satisfied, the prism is stopped and the bar codes are scanned and read.

Myer uses any odd numbered reflection prism or three mirrors arranged to duplicate an Abbe prism to accomplish a beam rotating means. The scanning beam is rotated until the proper orientation with respect to the bar coded data is obtained and the data is then read.

None of these prior constructions shows a system or method for reading characters in which the means for rotating the beam (or prism) is stationary while indicia are scanned to determine the current or observed orientation. It is an object of the invention to provide a system in which the indicia and the surrounding area are scanned in a known sequence. Once the observed orientation is obtained, the means for rotating the beam is rotated to a position which allows the scanning beam to scan the indicia and characters in a predetermined orientation with respect thereto.

SUMMARY OF THE INVENTION

In accordance with the present invention a coherent light source such as a gas laser produces or generates a narrow beam of coherent light which is directed through a telescope located along the path of the beam. The telescope focuses the beam of coherent light onto an area. The focused beam of light from the telescope is directed by a scanning means across the area in a known sequence. A beam rotating means such as a dove prism is located intermediate the scanning means and the area which is being scanned. A written medium having characters and indicia thereon is presented to the system within the area which is scanned. It is desired to read the characters; however, the characters are presented at a random orientation with respect to the system disclosed therein. As a laser beam is scanned across the written medium, light reflected therefrom is received by a photomultiplier detector through a filter. The optical filter only passes light having a wavelength which is substantially identical to the wavelength of the light produced by the laser. The scanning means (or scanner) has two mirrors each of which is independently driven by a servo motor so as to produce a systematic scan of the area which is known. For example, the scan could be a rectangular scan with each sweep of the laser beam spaced at equal distance from the last sweep from one side of a rectangular area to its opposite side or the scan could be a raster type scan or any other scan known in the art as desired. The output of the photomultiplier detector which is responsive to the light reflected from the written medium and the indicia thereon is amplified and converted from an analog signal to a digital signal. The digital signals are utilized by a processor to recognize and locate the indicia. The indicia are special characters which are designed for their particular quality of ease of recognition in any orientation but also having a certain observable orientation. The indicia are positioned on the written medium with a certain fixed, preselected orientation to the characters on the written medium.

The digitalized output of the photomultiplier detector is received by the processor which recognizes the indicia and then determines the angle between the observed orientation of the indicia and a certain predetermined orientation at which it is desired to read the characters. The processor, after calculating the angle, supplies the information to a digital/analog converter which drives a motor which in turn rotates a prism or other beam rotating means so that the characters can now be scanned in the known sequence at the desired orientation which is, of course, predetermined. This orientation would ordinarily be standard orientation at which the characters are read if human readable (that is, readable by human beings), or in case of a bar code would be substantially perpendicular to the bar codes.

The processor also provides the necessary signals to drive the servo motors of the scanner so that the known sequence is generated by the scanner. The processor can associate the output of the photomultiplier detector to the proper portion of the known sequence from moment to moment.

As shown herein, the written medium which can be located on articles moving along a conveyor belt for example, are presented at random orientations for the purposes of reading the characters thereon. The beam rotating means is stationary when the written medium is presented. A scan of the written medium is then made and the indicia located thereon. The indicia and the characters have a fixed orientation with respect to one another. The processor then determines the angle through which the beam rotating means must be rotated so that the characters on the written medium can be read. In order to perform this function, the processor must first locate the indicia on the written medium and determine the angular movement of the beam rotating means necessary to scan the characters with the known sequence of the scan having a certain predetermined orientation with respect to the characters.

It should be appreciated by those still in the art that various prisms and arrangements of mirrors can be utilized to alter the placement of the components of the apparatus and method described herein.

BRIEF DESCRIPTION OF THE DRAWINGS

FIGS. 7, 8 and 9 comprise a portion of the processor of FIG. 1; and

FIG. 10 is a standard tag utilizing OCR-A with indicia added thereto.

DESCRIPTION OF THE PREFERRED EMBODIMENT

Figure 1:
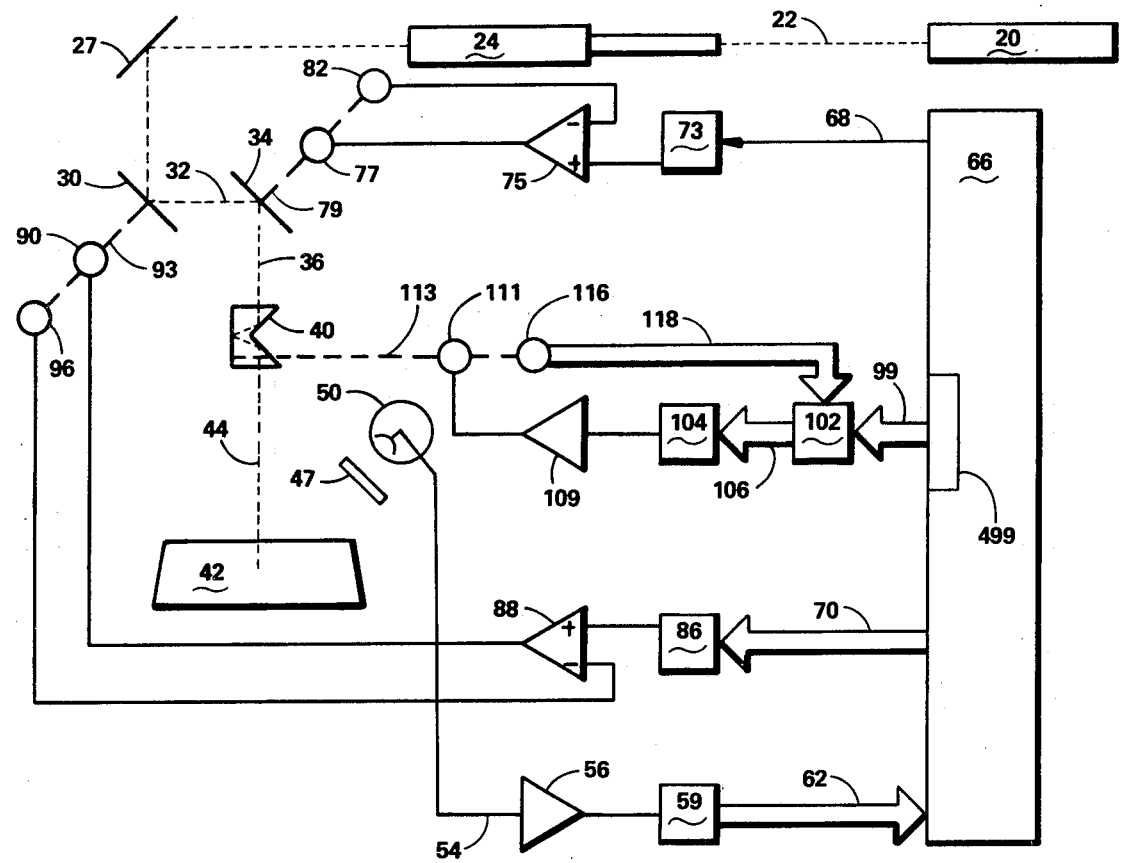
FIG. 1 is a diagrammatic view of an apparatus for reading randomly oriented characters constructed according to the present invention.

The apparatus and method for reading randomly oriented characters as shown in FIG. 1 has a coherent light source or laser 20. The laser directs a beam of light (shown by the dotted line 22) outward through a telescope 24 onto a positioning mirror 27. Although a coherent light beam is shown, any beam of light which is capable of being focused to a proper spot size as discussed hereinafter can be utilized. Such a beam could be emitted by an incandescent lamp or sealed beam lamp, but the best results have occurred utilizing a laser. The beam is reflected from the positioning mirror 27 at right angles and onto a scanning mirror 30. The beam is directed by scanning mirror 30 forming a first scanning beam 32 which is directed toward a second scanning mirror 34. The scanning beam 32 is reflected by mirror 34 and forms a second scanning beam 36 which is directed through a beam rotating means or prism 40 onto an area 42. The beam rotating means 40 is, as shown in FIG. 1, an Abbe prism which has an odd number of reflecting surfaces. The effect of the prism is to rotate the scanning beam about the longitudinal axis of the prism which is perpendicular to the area 42. As the prism rotates through an angle $x$ the beam is rotated about an angle $2x$. It is well known in the art that a prism, which has an odd number of mirrors and is designed so that the entering and exiting beams have a common axis which is coincident with the axis of rotation of the prism, acts to rotate incident radiations of light which causes the rotation of an image when the prism is rotated. The rotated scanning beam 44 scans across the area 42. Characters and indicia (not shown in FIG. 1) are placed within the area 42 to be read. The telescope 24 focuses beam 22 through the scanner comprised of scanning mirrors 30 and 34 and their associated hardware onto the area 42 for a certain spot size. The telescope 24 can be omitted if the beam has a sufficiently small spot on the area 42 because the function of the telescope is to focus the laser beam to a desired spot size on the area to be read. The telescope controls the beam convergence for maximum depth of field with the desired spot size coinciding with a minimum divergence.

A portion of the light reflected from within area 42 passes through an optical filter 47 to a photomultiplier detector 50. The optical filter 47 extends over the detector and blocks substantially all the light which would ordinarily pass through to potomultiplier detector 50 except for that light which has a wavelength substantially identical to the wavelength of the light omitted by the laser 20. In other words, the filter 47 has a narrow band pass with the wavelength of the laser 20 being at the center of the band pass. The filter could be omitted if ambient light is not a problem. The photosensor of the system which is shown as the photomultiplier detector 50 can be a photodiode, phototransistor or any other appropriate light sensor.

The output of the photomultiplier detector 50 is connected through line 54 and an amplifier 56 to analog-to-digital converter 59. The output of converter 59 is connected through multiline channel 62 to a processor 66. The processor 66 utilizes the output of the photomultiplier detector to locate and recognize certain indicia and characters located within the area 42. The processor 66 controls the scanning by mirros 30 and 34 through its outputs to line 68 and multiline channel 70. Processor 66 is connected through line 68 to a ramp generator 73. The output of ramp generator 73 is a ramp function which is applied to the positive terminal amplifier 75. The output of amplifier 75 is connected to a galvanometer 77 which is connected through a shaft 79 to mirror 34. Galvanometer 77 is also connected through shaft 79 to position sensor 82. The output of the position sensor 82 is connected to the negative input of amplifier 75. Processor 66 is connected through channel 70 to a digital-to-analog converter 86. The output of converter 86 is connected to the positive input of amplifier 88. The output of amplifier 88 is connected to a galvanometer 90. Galvanometer 90 is connected to mirror 30 by a shaft 93. Shaft 93 is also connected to position sensor 96. The output of the position sensor 96 is connected to negative input of amplifier 88. The other output of processor 66 is through multiline channel 99 to an arithmetic unit 102. The output of arithmetic unit 102 is connected to a digital-to-analog converter 104 through a multiline channel 106. The output of converter 104 is connected through the amplifier 109 to a servo motor 111. Servo motor 111 is connected through a shaft 113 and possibly gears (not shown) to beam rotating means 40. A shaft angle encoder 116 is located on shaft 113 and provides a digital output representing the angular position of the shaft through multiline channel 118 to arithmetic unit 102.

The laser 20 can be a continuous helium-neon laser such as that manufactured by Spectraphysics and designated as Model 136 having a wavelength of 632.8 mm. The beam 22 produced by the laser 20 is focused by the telescope 24 onto the area 42 through the scanner which comprises mirrors 30 and 34 and through the beam rotating means 40. The scanning of mirros of 30 and 34 is controlled by the processor 66 via its output to ramp generator 73 and converter 86. The ramp function produced by generator 73 causes mirror 34 to perform a complete scan, return to its initial position, and then perform another scan as the ramp function from generator 73 is again produced. Digital to analog converter 86 receives a multibit code which is updated by a counter within processor 66 which is incremented each time converter 73 has produced a ramp function. Mirror 30 is moved slightly after each scan by mirror 34. After a complete scan in the known sequence described, mirror 30 is returned to its initial position and again incremented. Thus the area 42 is scanned in a rectangular pattern with the beam 44 traversing the area, then returning to one side as scanning mirror 30 is stepped to the next position. Then the beam 44 again traverses the area.

Although a rectangular scanning pattern is shown herein, it should be readily apparent to those skilled in the art that other scanning patterns are possible and further that multifaceted mirrors or acousto-optic devices could be utilized. Also, the light source 20 and telescope 24 could be moved as a unit in a scanning pattern.

After processor 66 has determined the angular position to which it is desired to rotate beam rotating means or prism 40, a digital output corresponding to the desired angular change is outputted by processor 66 on channel 99. The change of position of the beam rotating means is given by shaft encoder 116 to arithmetic unit 102 channel 118. The desired and the current angular change are compared within arithmetic unit 102 and the output to channel 106 represents the difference there between. For example, if the desired amount of angular change and the current angular change are the same, the output of arithmetic unit 102 to converter 104 would be zero and therefore the output of amplifier 109 to servo motor 111 would be zero and the servo motor would be at rest or, in other words, it would be deactivated. The result is that the angle through which the prism 40 must be rotated is calculated and the prism 40 rotated through that angle. Unit 102 can be included in processor 66.

Figure 5:
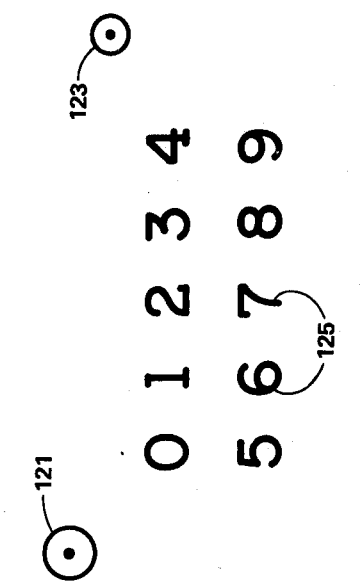
FIG. 5 is an enlarged view of a portion of a written medium having indicia and characters located thereon.

An example of characters and indicia which could be presented within area 42 for recognition is shown in FIG. 5. The indicia shown in FIG. 5 are a large bull's-eye 121 and a similar but smaller bull's-eye 123. Written material which is desired to read is comprised of a plurality of characters 125 which can be alphanumeric. The characters and the indicia have a fixed orientation with respect to each other. That is, the bull's-eyes 121 and 123 have a certain relationship. For example, a line could be drawn through the centers of the two bull's-eyes. The line formed by the characters which are printed in a normal format have a certain angular relationship to the line between the bull's-eyes. All the labels presented to be read have the same orientation between the bull's-eyes and the characters and, more particularly, the general lines defined by the characters.

The processor identifies the angle through which it is necessary to rotate the prism 40 in order that the area 42 is scanned in the desired orientation by locating the indicia and determining the observed orientation with respect to the known sequence. After the prism 40 is rotated and the scan has the desired orientation with respect to the characters 125, the characters 125 are scanned and the output of photomultiplier detector 50 is sensed by processor 66 or other recognition units (not shown) to recognize the characters 125.

Figure 2:
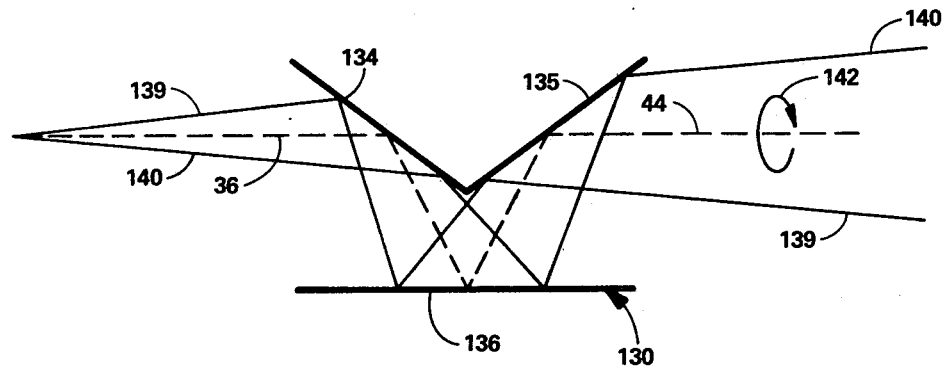
FIG. 2 is a graphic view of the function and construction of a mirror system simulating an Abbe prism utilized in the present invention.

The beam rotating means 130 of FIG. 2 is of the same general configuration as the Abbe prism 40 shown in FIG. 1. Three mirrors 134, 135 and 136 are disposed so that mirrors 134 and 135 form a "V" spaced from mirror 136. Beam 36 is reflected by mirror 134 onto mirror 136 and by mirror 136 onto mirror 135. The light reflected from mirror 135 forms beam 44. Beam 44 is, as discussed above, directed toward the area 42. The boundaries of the scan of beams 36 and 44 are shown by solid lines 139 and 140. The scan of beam 44 is rotated with respect to beam 36 by the rotation of beam rotating means 130 about an axis coincident with the lines designated by the numerals 36 and 44 as shown by arrow 142. As the beam rotating means 130 is rotated through an angle $x$, the scan is rotated by a factor of $2x$. The mirrors 134 and 135 are mounted at equal angles from the axis of rotation. Mirror 136 is located parallel to the axis of rotation.

Figure 3:
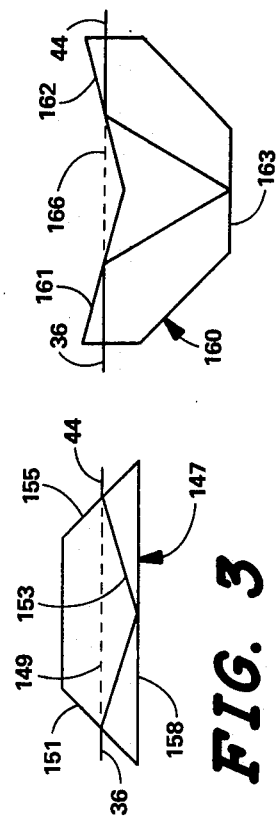
FIG. 3 is a side view of a Dove prism.

FIG. 3 shows Dove prism 147 which can be utilized as a beam rotating means. The Dove prism is rotated about an axis 149 which is coincident with the entry (or scanning) beam 36 and the exit (or rotated) beam 44. The beam 36 is refracted at the prisms surface 151 and the exiting beam 153 is retracted as the prism surface 155. A cross section of the prism is basically a trapezoidal shape with one side 158 being a mirror.

Figure 4:
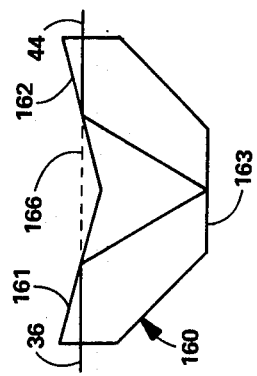
FIG. 4 is a side view of an Abbe prism.

The Abbe prism 160 shown in FIG. 4 has the same three mirror arrangement as the mirror of means 130 of FIG. 2. The mirrors 161 through 163 correspond to mirrors 134 through 136, respectively. The prism is rotated about the axis 166 to rotate the beam 44 with respect to beam 36. It is possible to use other prisms such as the Taylor, Schmidt and Uppendahl. Any prism for which the entry and exit beams have a common axis which is coincident with the axis of rotation of the prism and having an odd number of mirrors acts as a beam rotator to cause or prevent the rotation of an image as desired. The design and characteristics of various prisms for rotating beams is set forth in "Optical Systems Design", University of Rochester (1969).

In order to utilize the full scan of the beam, it is generally desirable to place the prism or beam rotating means adjacent the second scanning mirror 34, for example, within two inches.

The written matter comprises of bull's-eyes 121 and 123 and the characters 125 (as shown in FIG. 5) could be a label which is placed on an article. The articles with the labels are presented within area 42 for the purpose of reading the characters. The articles with the labels thereon are presented in a random orientation for the purpose of reading the characters. However, the bull's-eye have a fixed orientation with respect to the characters as discussed above. The indicia could be one or more characters, bars of a bar code or other special indicia or benchmarks such as an arrow. The bar codes could be the bar codes currently used for marking foodstuffs in grocery stores which is generally referred to as Universal Product Code (UPC). Further, the article with the label as shown in FIG. 5 could be moving slowly within respect to the system disclosed herein on a conveyor belt or be passed through area 42 by hand. The speed of movement of the label would be required to be slow relative to the scanning rate of the beam. It is also possible that the transparent material could be placed between area 42 and the beam rotating means 40, adjacent to area 42, such that the labels or other written materials could be placed within area 42 by resting them against the transparent material.

Figure 6:
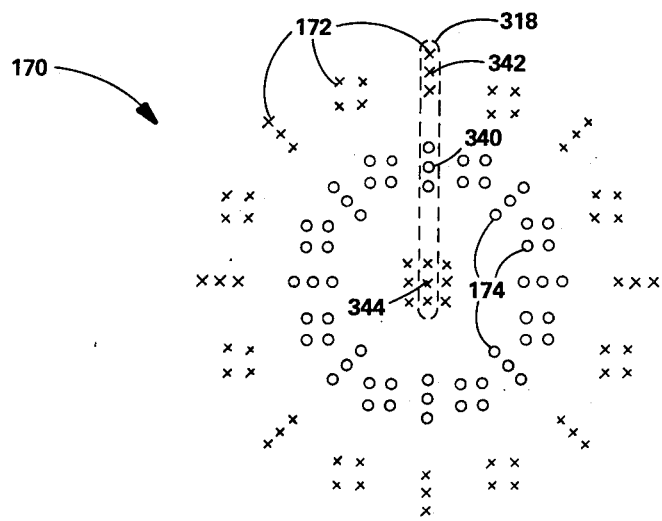
FIG. 6 is an enlarged view of a template for recognizing one of the indicia shown in FIG. 5.

A recognition template 170 for the large bull's-eye 121 of FIG. 5 is shown in FIG. 6. The "Xs" 172 indicate the presence of a character segment and the "Os" 174 indicate the absence of a character segment. Thus in order to recognize the bull's-eye, it is necessary that character segments be found in most or all of the "Xs" shown in FIG. 6 and that the lack of character segments be found in all or most all of the locations containing "Os" in FIG. 6.

Figure 9:
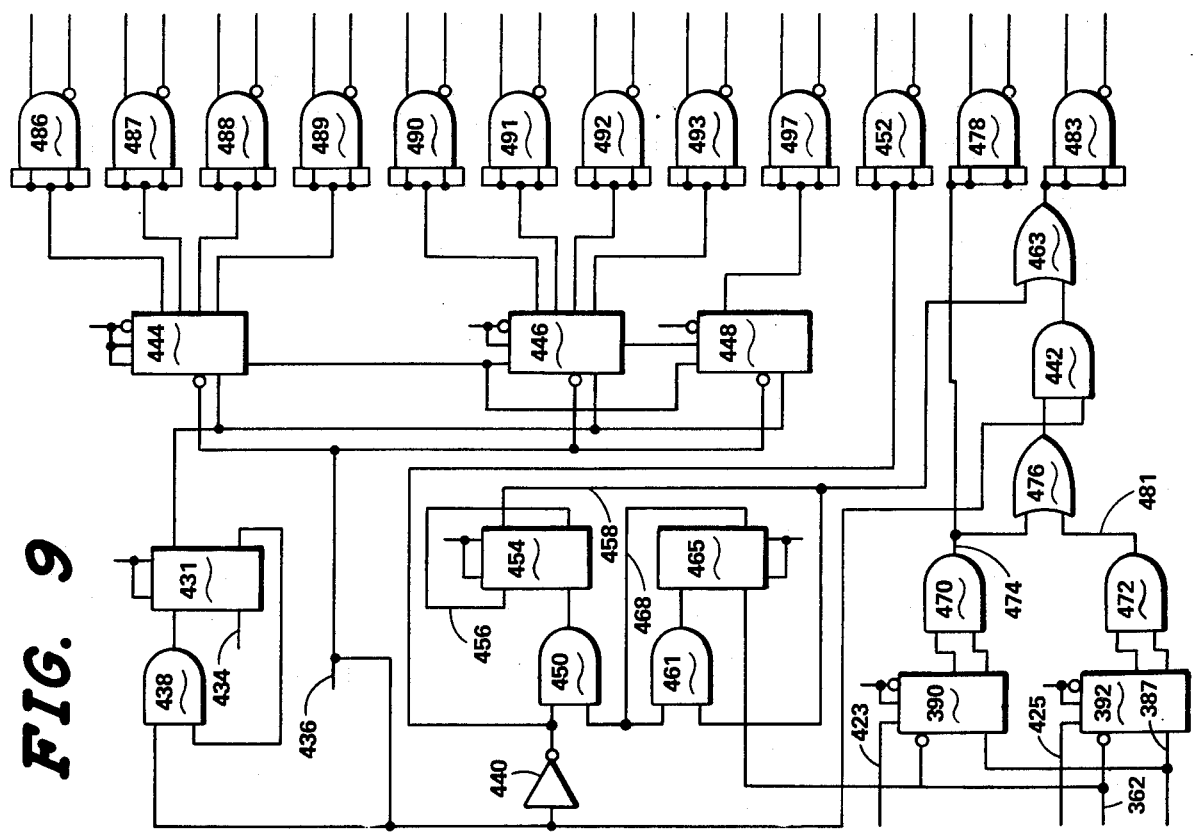
Figure 7:
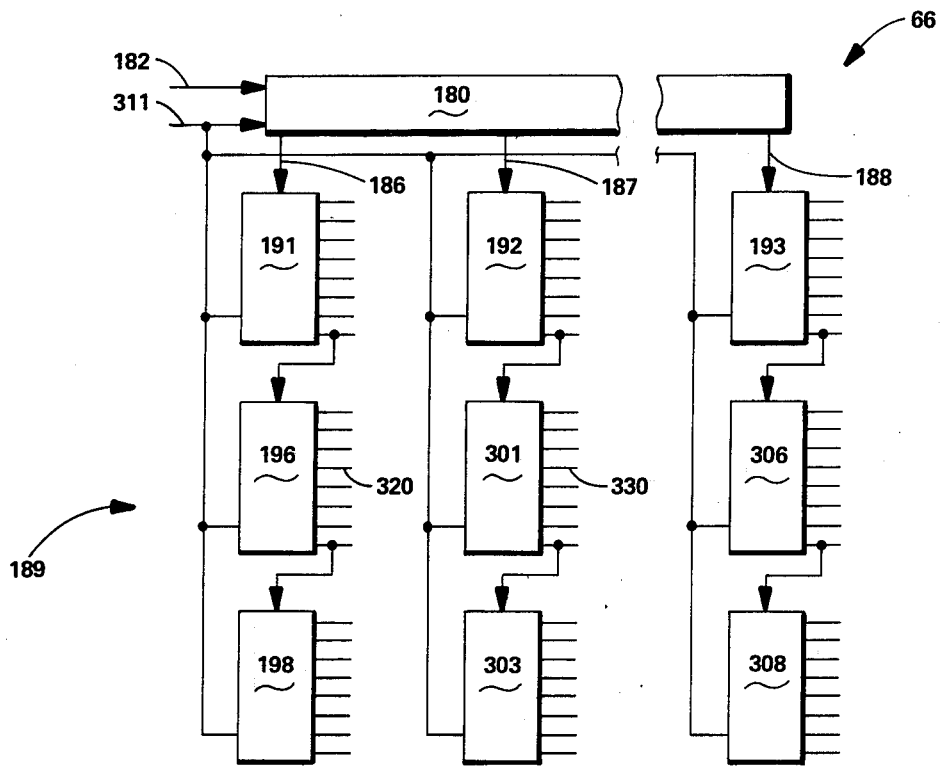

A portion of the processor 66 of FIG. 1 is shown in FIGS. 7, 8 and 9. The output of analog-to-digital converter 59 is inspected to determine if the output indicates a character segment or the absence thereof. If a character segment is indicated, then the output is, in this example, a logic "1" and if the absence of a character segment is indicated the output is a logic "0". The logic "1s" and logic "0s" are received by a shift register 180 on line 182. Shift register 180 has multiple pickoff points although only three such points are shown as indicated by lines 186 through 188 in FIG. 7. The digital data received on line 182 is moved through shift register 180 so that each bit of data is available at each of the lines 186 through 188 during some interval, although of course line 188 receives the same bit of data as line 186 after some delay.

A plurality of shift registers 189 is connected to shift register 180. Each of lines 186 through 187 is connected to a shift register, 191 through 193, respectively. The binary bits move through shift register 191, through shift register 196 and into shift register 198. Shift register 192 and its associated shift registers 301 and 303 and shift register 193 and its associated shift registers 306 and 308 operate similarly to shift register 191 and its associated shift registers 196 and 198 as discussed above. The movement of the data bits through shift registers 180, 191 through 193, 196, 198, 301, 303, 306, and 308 is controlled and synchronized by the data clock pulse present on line 311 which is connected to all of the clock inputs of those shift registers.

The outputs of shift registers 191 through 193, 196, 198, 301, 303, 306, and 308 are connected to a plurality of logic units to recognize the presence of the bull's-eye. For an example, NOR gates 314 through 316 (FIG. 8) are connected to the shift registers in FIG. 7 to recognize the portion of bull's-eye template 170 which is enclosed by the dotted line 318 (FIG. 6). In the preferred embodiment, there are 24 sets of shift registers connected to shift register 180 of which shift registers 191, 196 and 198 comprise a set. NOR gate 314 is connected to the sixth set from the left (as shown in FIG. 7) at the fourth output from the top (as shown in FIG. 7) of the second shift register through line 322. As shown in FIG. 7 the fourth output of the second shift register of a set would be, for example, line 320 of shift register 196. Another input of NOR gate 314 is connected through line 324 to the fourth line from the top of the second shift register of the seventh set of shift registers from the left. NOR gate 314 is also connected through line 326 to the fourth output from the top of the second shift register of the eighth set of shift registers from the left. Another input to NOR gate 315 is connected through line 320 to the fourth input of the second shift register of the first set, i.e., shift register 196. Another input of NOR gate 315 is connected through line 330 to the fourth output of the second shift register of the second set of shift register from the left that is shift register 301. Line 332 connects an input of NOR gate 315 to the fourth input of the second shift register of the third set of shift registers of FIG. 7. Lines 335 through 337 connect NOR gate 316 to the fourth input of the second shift register of the eleventh, twelfth, and thirteenth sets, respectively, of the plurality of shift registers 189 of FIG. 7. The number of shifts between the pick up points within shift register 180 is such that during the scan of the indicia represented by bull's-eye 170, NOR gate 314 goes high indicating the 3 "Os" 340 (FIG. 6). At the same time NOR gate 315 goes low for the outer 3 "Xs" 342 enclosed by line 318, and NOR gate 316 goes low indicating that the presence of the inner three "Xs" 344 which are also enclosed by line 318. The output of NOR gate 314 is connected through an invertor 347 to a NOR gate 349. The outputs of NOR gate 315 and 316 are connected to NOR gate 349. When all of the inputs to NOR gate 349 are low, the output of NOR gate 349 to multiplexer 351 goes high. The high output of NOR gate 349 indicates that data in the shift registers conforms to the pattern display in FIG. 6 by "Xs" 342 and 344 and the "0s" 340. The other input to multiplexers 351 and the other multiplexers 354 through 356 similarly designate various portions of the "X" and "0" pattern shown in FIG. 6. The inputs from the shift registers and NOR gates for identifying the large bull's-eye 121 are connected to multiplexers 351 and 354. The outputs of the shift registers and associated NOR gates and other logic circuits for recognizing small bull's-eye 123 are inputs to multiplexers 355 and 356. A template for the small bull's-eye has a similar "X" and "0" pattern to that shown in FIG. 6 for the large bull's-eye 121, but, of course, it would be smaller.

A serial shift register 360 (FIG. 8) receives a low pulse each time the analog-to-digital converter 59 samples the output of photomultiplier detector 50 through line 362. The clock input of shift register 360 is connected to a clock pulse on line 364 which is of a much higher frequency than the frequency of the pulse on line 362. The low pulse from line 362 is loaded and moves serially through the shift register by the clock pulses on line 364. After some delay the low pulse on line 362, causes line 366 to go low. Line 366 is connected to the fourth serial output of the shift register 360, and to the clock input of a D-type flip-flop 368. Prior to receiving the low output from shift register 360, the clear input of flip-flop 368 which is connected to line 371 has gone low and set the output of flip-flop 368 to line 374 low and to line 376 high. When the input from line 366 goes low and then high, when shift register 360 shifts to a high pulse (this could occur after one or more shifts initiated by the clock pulse on 364 depending on the length of the pulse received on line 362), the output of flip-flop 368 on line 374 goes high and to line 376 goes low because line 376 is connected to the input of flip-flop 368. Line 374 is connected to an AND gate 378. The other input of AND gate 378 is connected to the clock pulse on line 364. The output of AND gate 378 is connected through line 380 to the clock input of a 4-bit counter 382. The clear input of counter 382 is connected to the data clock pulse on line 362 and, when it goes low, the output of counter 382 is set to "0000". The output of AND gate 378 is also connected through an inventor 385 and line 387 to the clock inputs of 4-bit counters 390 and 392 (FIG. 9).

The AND gate 378 goes high and low in response to the high and low, respectively, changes of the clock pulse on line 364 for the duration of the high signal on line 374. The clock pulses on line 380 at the output of AND gate 378 are counted by counter 382. The least significant bit of the output of counter 382 is connected through line 394 to AND gate 396 and 398. The next least significant bit of counter 382 is connected through line 400 to AND gates 402 and 404. The next bit of the output of counter 382 is connected through line 406 to AND gates 408 and 410. The most significant bit of counter 382 is connected through line 412 to AND gates 398, 404, and 410. The output of counter 382 to line 412 is also connected through inverter 414 to AND gates 396, 402, and 408. The outputs of AND gates 396, 402, and 408 are connected to the selection inputs of multiplexers 351 and 355. The outputs of AND gates 398, 404, and 410 are connected to the selection inputs of multiplexers 354 and 356. In addition, the strobe inputs of multiplexers 354 and 356 are connected to the output of invertor 414, and the strobe inputs of multiplexers 351 and 355 are connected to line 412.

The outputs of multiplexers 351 and 354 connected to OR gate 417, and the outputs of multiplexers 355 and 356 are connected to OR gate 419. The clock pulse present on line 364 is of a high enough rate that between data clock pulses on line 362 all of the outputs of the multiplexers become inputs to either OR gate 417 or OR gate 419. As counter 382 counts from "0000", the outputs of multiplexers 351 and 355 are strobed low and the inputs of multiplexers 354 and 356 are selected as outputs one at a time to OR gates 417 and 419, respectively. This occurs because the output of invertor 414 is high and therefore when lines 394, 400, and 406 go high, the outputs of AND gates 396, 402 and 408, respectively, go high. After eight counts, the output of counter 382 to line 412 goes high, and the output of line 414 goes low. Now when the outputs of counter 382 to lines 394, 400, and 406 go high, the outputs of AND gates 398, 404, and 410, respectively, go high. The high signal to multiplexers 355 and 351 cause their outputs to be strobe low. The inputs of multiplexers 351 and 355 become outputs to OR gates 417 and 419, respectively, one at a time. Thus all thirty-two inputs to multiplexers 351, 354, 355, and 356 are selected once between each data clock pulse on line 362. The inputs of multiplexers 351 and 355 are selected first and then the outputs of multiplexers 354 and 356 are selected. The output of OR gate 417 is connected through line 423 to the count input of counter 390 of FIG. 9. The output of OR gate 419 is connected to the count input of counter 392 through line 425. When AND gates 398, 404 and 410 are high, AND gate 426 goes high because all three inputs to AND gate 426 are high. This causes inverter 371 to go low which resets flip-flop 368 with its outputs to lines 374 and 376 low and high, respectively. This acts to cut off the clock pulse by maintaining the output of AND gate 378 at a low logic level.

The data clock pulses on line 362 are connected to the clear inputs of counters 390 and 392 which sets the output of the counters to "0000" each time new data is received. Referring back to FIG. 8, the data clock pulse on line 362 is inverted by an invertor 429 and connected to D-type flip-flop 431 (FIG. 9) through line 434. A begin scan pulse which indicates an entirely new scan of the area 42 (FIG. 1) is connected through line 436 to AND gate 438 and invertor 440 and AND gate 442. Further, the begin scan pulse on line 436 is connected to clear inputs of 4-bit counters 444, 446, and 448. The output of invertor 440 is connected to AND gate 450 and line driver 452.

The output of AND gate 450 is connected to the clock input of a D-type flip-flop 454. The output of flip-flop 454 to line 456 is high and to line 458 is low. Line 458 connects flip-flop 454 to AND gate 461 and OR gate 463. Line 456 is connected to the D-input of flip-flop 454. The output of AND gate 461 is connected to the D-input of flip-flop 465. The output of flip-flop 465 to line 468 is high. Line 468 connects flip-flop 465 to inputs of AND gates 450 and 461. The clock input of flip-flop 465 is connected to the data clock pulse on line 362. The output of counter 390 is connected to AND gate 470 such that the output of AND gate 470 goes high when counter 390 contains twelve or more counts, i.e., when the two most significant digits of the 4-bit counter are high. The outputs of counter 392 are connected to AND gate 472 in a similar manner so that AND gate 472 goes high when counter 392 contains twelve or more counts. As multiplexers 351, 354, 355 and 356 (FIG. 8) cycle through their sixteen inputs, the high signals on lines 423 and 425 are counted by counters 390 and 392, respectively. Thus if twelve or more lines out of the sixteen lines of either multiplexers 351 and 354, or 355 and 356 are high, either AND gate 470 or 472, respectively, goes high.

The output of AND gate 470 is connected through line 474 to OR gate 476 and line driver 478. The output of AND gate 472 is connected to OR gate 476 through line 481. The output of OR gate 476 is connected as input to AND gate 442. The output of AND 442 is connected to an input of OR gate 463 which is in turn connected to a line driver 483. The outputs of counters 444 and 446 are connected to line driver 386 through 493. The least significant bit of counter 448 is connected to line driver 497 which is also wired as a driver.

In operation when the signal to line 436 goes low indicating that a scan of the area 42 has begun, counters 444, 446, and 448 are set to zero, and the output of invertor 440 goes high. Because the output of flip-flop 465 to line 468 is high, AND gate 450 goes high when the output of invertor 440 goes high. This causes the output of flip-flop 454 to line 458 to go high and its output to line 456 to go low. The high signal on line 458 causes OR gate 463 to go high which in turn causes AND gate 483 to go high. Since AND gates 452 and 453 are both high, this indicates that a scan has begun to the remainder of processor 66. Because both inputs to AND gate 461 are high during the next low to high transition of the data clock clock pulse on line 362, the output of flip-flop 465 to line 468 goes low. AND gates 450 and 461 go low and during the next low to high transitions of the clock on line 362, the output of flip-flop 465 to line 468 goes high. As the input to invertor 440 is still low, AND gate 450 goes high and the output of flip-flop 454 to line 458 goes low and to line 456 goes high. Whereupon the output of OR gate 463 goes low and the system is prepared to recognize and locate a bull's-eye. When the signal on line 362 goes low, counters 390 and 392 are set to "0000". Thus the output of OR gate 476 is low and even though the signal on line 436 is high, the output of AND gate 442 is low. The data from photo-multiplier detector 50 is digitalized and transformed into a single bit of data, which indicates either the presence of absence of a character segment, is fed into shift register 180 (FIG. 7) and thereafter into plurality of shift registers 189. Each time the pulse on line 434 goes from low to high, flip-flop 431 toggles and the output of this causes the output of flip-flop 431 to effectively divide the pulse rate on line 432 by factor two. The output of flip-flop 431 acts as the clock pulse for counters 444, 446 and 448. Counter 444 is wired such that as each clock pulse from flip-flop 431 occurs, the count of counter 444 is incremented by one. The carry output of counter 444 is connected to the enable inputs of counters 446 and 448. Further the carry output of counter 446 is connected to the enable input of counter 448. Thus the count contained in counters 444, 446, and 448 represents the number of data clock pulses divided by two. This count appears as the output of line drivers 486 through 493 and 497.

When either AND gate 470 or 472 goes high indicating that a count of twelve exists in counter 390 or 392, respectively, OR gate 476 goes high. If the signal on line 436 is high indicating that a scan is not being started, AND gate 442 goes high and in turn OR gate 463 goes high. The output of OR gate 463 causes the output of line driver 483 to go high. (Each of line drivers 486 through 493, 497, 452, 478, and 483 has an inverted output so that it is suitable to act as a differential line driver.) If AND gate 470 is high, the output of line driver 478 is high which indicates that the large bull's-eye has been recognized. If line driver 483 goes high and line driver 478 remains low, this indicates to the arithmetic unit 499 (FIG. 2) within processor 66 that the small bull's-eye is recognized. Line drivers 486 through 493 and line driver 497 indicate the position of the bull's-eye. Arithmetic unit 499 (FIG. 1) takes the positions of the bull's-eyes and determines the angle necessary to rotate the beam rotating means or prism 40 to a position so that the area 42 is scanned with the desired orientation. The position of the two bull's-eyes provides information concerning the observed orientation.

As shown in FIG. 10, a large bull's-eye 502 and a small bull's-eye 504 are shown on a typical label utilizing the font known as OCR-A. After the bull's-eyes have been scanned and recognized, and the beam rotating means rotated to scan the characters 507 at the desired orientation, those characters are then recognized utilizing standard optical character recognition techniques.

In summary, a coherent light source produces a beam which is scanned across an area in which indicia are present. The beam of coherent light is focused by a telescope onto the area and a beam rotating means is located between the area which is scanned and the components of the system which produce the scan. The light reflected from the indicia and the written medium upon which the indicia are located is filtered to allow only light substantially of the wavelength of the laser beam to be presented for detection by a light sensor. The output of the light sensor is digitalized and received by a processor which recognizes the indicia and determines the location thereof with respect to the scan. The processor determines the observed orientation and then calculates the angle necessary to rotate the rotating means in order that the scanning beam may be utilized to scan characters located adjacent to the indicia. The angle calculated could be provided to a second scanner located downstream from the first scanner if the written medium is located on a moving object and the scan rate was very slow. The indicia and the characters have a fixed orientation with respect to one another, that is, they are located with respect to each other similarly on each written medium presented.

In operation, the scanning beam is passed through a beam rotating means and scanned across an area in a known sequence. The beam rotating means is located between the scanner and the area which is scanned. Indicia which are present upon a writing media having characters in fixed relationship thereto are recognized and the observed orientation determined by a processor. Once the observed orientation is determined, the beam rotating means is rotated in order that the area is scanned in a certain predetermined orientation with respect to the known sequence of the scan characters so that the characters can be recognized. Thus, the system compensates for characters which are presented in a random orientation with respect to the system. It should be readily apparent to those skilled in the art that one advantage of the present system is that low illumination power is required because only a small spot of the written medium need be illuminated at any one moment.

Having described the invention in connection with certain specific embodiments thereof, it is to be understood that further modifications may now suggest themselves to those skilled in the art and it is intended to cover such modifications as fall within the scope of the appended claims.

What is claimed is:

1. An orientation compensation system to read characters on a written medium disposed in a random orientation with respect to said system, said characters having a fixed orientation to an indicia located adjacent to said characters, comprising:
   a. a narrow beam of light being scanned across said indicia in a known sequence;
   b. a beam rotating means receiving said beam for rotating incident radiations of said beam to alter the orientation of said known sequence relative to said indicia;
   c. a light sensor positioned to respond to the level of light reflected from said written medium and said indicia thereon;
   d. a processor receiving the output of said light sensor for determining the angle between observed orientation of said known sequence to said indicia and a desired predetermined orientation of said known sequence to said indicia, said processor generating a signal corresponding to a said angle; and
   e. motor means for rotatably moving said beam rotating means in response to said signal to scan said characters with said known sequence at said predetermined orientation thereto.

2. System as set forth in claim 1 wherein said beam rotating means comprised a reflecting prism for reflecting received light of said beam an odd number of times prior to the emergence thereof.

3. System as set forth in claim 1 wherein said beam rotating means is any odd number of mirrors.

4. System as set forth in claim 1 including a telescope located intermediate said light source and said beam rotating means to focus said beam onto said indicia.

5. System as set forth in claim 1 wherein said beam is produced by a gas laser.

6. System as set forth in claim 1 wherein said written medium moves slowly relative to the scanning rate of said beam.

7. System as set forth in claim 6 wherein said beam rotating means comprises a reflecting prism for reflecting received light of said second beam an odd number of times prior to the emergence thereof.

8. System as set forth in claim 1 including an optical filter extensive over said light sensor for passing only light having substantially the wavelength of said light source to said light sensor.

9. System as set forth in claim 8 wherein said first scanning means begins at an initial location and moves at a constant rate throughout its scan, said first scanning means returning to the initial location after each scan, and said second scanning means moves in increments after each scan of said first scanning means to product said known sequence.

10. System as set forth in claim 8 including a telescope located intermediate said light source and said first scanning means to focus said beam onto said indicia.

11. System as set forth in claim 8 wherein said light source is a gas laser.

12. System as set forth in claim 8 including an optical filter located between said light sensor and any light received thereby, sid optical filter passing only light having a wavelength approximately the same as the wavelength of the light emitted by said light source.

13. In a system for recognizing characters and indicia on a written medium, said indicia having a certain orientation with respect to said characters, said characters having a random orientation to said system when presented for reading puposes, the combination comprising:
 a. a light source emitting a narrow beam of light;
 b. a scanner positioned to receive said beam and redirect the light thereof to form a scanning beam traversing said indicia in a known sequence;
 c. a light sensor means positioned to receive light reflected from said written medium, said light sensor means responding to the reflected light to produce an output corresponding thereto;
 d. a processor connected to the output of said light sensor means for recognizing said indicia and determining the angle between the observed orientation and a desired orientation, said processor generating a signal uniquely corresponding to the angle determined;
 e. a beam rotating means positioned between said scanner and said indicia for rotating said scanner beam; and
 f. means selectively actuated to rotate said beam rotating means in response to the signal produced by said processor for scanning said characters at said predetermined orientation.

14. A system for reading a written medium having indicia located thereon, said written medium being presented for reading in a random orientation with respect to said system, comprising;
 a. a light source emitting a narrow beam of light;
 b. first scanning means directing said beam for producing a first scanning beam;
 c. a second scanning means receiving said first scanning beam for producing a second scanning beam adapted to systematically scan a two dimensional area;
 d. beam rotating means receiving said second scanning beam for rotating said second scanning beam about an axis and directing said second scanning beam onto said indicia;
 e. a light sensor positioned to receive light of said second scanning beam reflected from said written medium including said indicia;
 f. a processor receiving the output of said light sensor for determining the angle between the orientation of said indicia observed and a certain predetermined orientation desired for reading said characters, said processor regenerating a signal corresponding to the magnitude of the angle; and
 g. a motor means for rotating said beam rotating means in response to said signal to scan said characters in said predetermined orientation.

15. A system for reading characters on a written medium presented at a random orientation, said characters having a fixed relationship to indicia located on said written medium, comprising;
 a. a light source producing a light beam;
 b. first means for directing said beam across an area on said written medium having said indicia thereon in a known sequence;
 c. second means positioned to receive a portion of light reflected from said written medium;
 d. third means located intermediate said first means and said written medium for rotating incident radiations of the directed beam;
 e. fourth means receiving the output of said second means for determining said random orientation of said indicia with respect to said known sequence;
 f. fifth means connected to said fourth means to determine the angular relationship between a desired predetermined orientation of said known sequence to said indicia and said random orientation, said fifth means generating an output corresponding to said angles; and
 g. sixth means connected to said third means for selectively rotating said third means to a position in response to said output of said fifth means for scanning said characters by the directed beam in said known sequence at said predetermined orientation.

16. A method of compensating for random orientation of a written medium having characters located thereon, said characters having a fixed orientation with respect to indicia also located on said written medium comprising the steps of:
 a. scanning said indicia with a narrow beam of light in a known sequence;
 b. determining the observed orientation of said indicia from said light reflected by said written medium and said indicia; and
 c. rotating said beam of coherent light to scan said characters in said known sequence at a desired orientation with respect to said characters.

* * * * *